United States Patent
King et al.

(10) Patent No.: US 6,984,262 B2
(45) Date of Patent: Jan. 10, 2006

(54) ADHESION ENHANCING COATING COMPOSITION, PROCESS FOR USING AND ARTICLES PRODUCED

(75) Inventors: Eric M. King, Pittsburgh, PA (US); James P. Colton, Trafford, PA (US); Jessica A. Hoch, Saint Petersburg, FL (US)

(73) Assignee: Transitions Optical, Inc., Pinellas Park, FL (US)

( * ) Notice: Subject to any disclaimer, the term of this patent is extended or adjusted under 35 U.S.C. 154(b) by 19 days.

(21) Appl. No.: 10/620,403

(22) Filed: Jul. 16, 2003

(65) Prior Publication Data

US 2005/0014004 A1 Jan. 20, 2005

(51) Int. Cl.
 C09D 163/00 (2006.01)
 C09D 163/02 (2006.01)
 C09D 183/00 (2006.01)
 B32B 27/38 (2006.01)

(52) U.S. Cl. .............. 106/287.22; 106/287.11; 106/287.13; 106/287.14; 106/287.15; 106/287.16; 106/287.18; 106/287.19; 522/31; 522/32; 522/49; 522/59; 522/63; 522/65; 522/66; 522/67; 523/400; 523/402; 523/458

(58) Field of Classification Search ........... 106/287.11, 106/287.13, 287.14, 287.15, 287.16, 287.18, 106/287.19, 187.18, 287.22; 522/31, 32, 522/49, 59, 63, 65, 66, 67; 523/400, 402, 523/458; 428/414, 415
See application file for complete search history.

(56) References Cited

U.S. PATENT DOCUMENTS

| | | | |
|---|---|---|---|
| 3,849,137 A | 11/1974 | Barzynski et al. .............. 96/67 |
| 3,991,033 A | 11/1976 | Sam ........................ 260/67 FP |
| 4,086,210 A | 4/1978 | Petropoulos .............. 260/67 R |
| 4,211,823 A | 7/1980 | Suzuki et al. ................ 428/412 |
| 4,232,088 A | 11/1980 | Humphrey, Jr. ............. 428/412 |
| 4,291,098 A | 9/1981 | Tanaka et al. ............. 428/412 |
| 4,343,857 A | 8/1982 | Uram, Jr. .................... 428/336 |
| 4,368,253 A | 1/1983 | Green et al. ................. 430/326 |
| 4,525,421 A | 6/1985 | Kubota et al. .............. 428/412 |
| 4,556,605 A | 12/1985 | Mogami et al. ............. 428/331 |
| 4,756,973 A | 7/1988 | Sakagami et al. .......... 428/412 |
| 4,889,413 A | 12/1989 | Ormsby et al. ............. 350/354 |
| 5,221,560 A | 6/1993 | Perkins et al. .............. 427/515 |
| 5,451,345 A | 9/1995 | Hatton et al. .......... 252/174.15 |
| 5,639,802 A | 6/1997 | Neckers et al. ............... 522/25 |
| 5,827,923 A | 10/1998 | Medford et al. ............ 524/854 |
| 6,025,026 A | 2/2000 | Smith et al. ................. 427/316 |
| 6,060,001 A | 5/2000 | Welch et al. ................ 252/586 |
| 6,150,430 A | 11/2000 | Walters et al. ................ 522/79 |
| 6,187,444 B1 | 2/2001 | Bowles, III et al. ..... 428/423.1 |
| 6,268,055 B1 | 7/2001 | Walters et al. .............. 428/413 |
| 6,429,235 B1 | 8/2002 | Varlemann et al. ........... 522/14 |
| 6,432,544 B1 | 8/2002 | Stewart et al. ........... 428/424.2 |
| 6,506,488 B1 | 1/2003 | Stewart et al. .............. 428/332 |
| 6,534,187 B2 | 3/2003 | Kron et al. .................. 428/447 |
| 6,723,440 B2 * | 4/2004 | Valeri et al. ................. 428/447 |
| 2002/0061407 A1 | 5/2002 | Colton et al. ............... 428/447 |

FOREIGN PATENT DOCUMENTS

| | | |
|---|---|---|
| JP | 345651 | 1/1992 |
| JP | 11 061 078 | 5/1999 |
| WO | WO 01/02449 A2 | 11/2001 |

OTHER PUBLICATIONS

ASTMD 3539-02 "Standard Test Method for Measuring Adhesion by Tape Test—Method B".
U.S. Appl. No. 10/229,773 filed Aug. 28, 2002, "Photochromic Optical Article".

* cited by examiner

*Primary Examiner*—David Brunsman
(74) *Attorney, Agent, or Firm*—Frank P. Mallak

(57) ABSTRACT

Described is a coating composition adapted to enhance the adhesion of a polymeric coating or film applied to a substrate. The coating composition is interposed between the substrate and the polymeric coating and comprises (a) at least one coupling agent, partial hydrolysates thereof or mixtures thereof in a concentration greater than 25 weight percent, based on the weight of the total composition, and (b) an adhesion enhancing amount of an epoxy-containing material having at least two epoxy groups. The coating composition is substantially free of photochromic materials and colloidal particles chosen from silica, alumina or mixtures thereof. Also described is a process for using the coating composition and articles coated with the composition and additional coatings and films which can be photochromic.

20 Claims, No Drawings

ADHESION ENHANCING COATING COMPOSITION, PROCESS FOR USING AND ARTICLES PRODUCED

BACKGROUND OF THE INVENTION

The present invention relates to coating compositions adapted to enhance the adhesion of a coating or film to a substrate, a process for producing an adherent coating or film on a substrate and the resulting coated or laminated substrate. More particularly, this invention relates to a coating composition containing coupling agents plus adhesion enhancing ingredients, processes for preparing adherent polymeric coatings or films on substrates and photochromic articles.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most frequently suggested classes of photochromic compounds are oxazines, pyrans, and fulgides.

It is reported that the outermost surface of most organic polymers is hydrophobic due to a preponderance of nonpolar groups and is, therefore, difficult to wet. Some polymers have such a low surface energy that it is difficult to formulate coatings that will wet the polymer surface. Many of the conventional coatings, e.g., protective hardcoats, paints, inks, and adhesives, applied to polymers are hydrophilic. Consequently, they do not form strong bonds with the hydrophobic surface of the polymer and, therefore, do not adhere well to the polymer.

Pretreatment processes are frequently used on polymeric substrates to increase the surface energy or wetting characteristics of the substrate and provide functional groups to interact with polar groups present in coatings or films applied to such substrates. Although methods exist for obtaining adhesion of coatings and films on various substrates, alternative methods are sought. There is a commercial need to produce adherent photochromic coatings and films on substrates in a rapid and economical manner.

DETAILED DESCRIPTION OF THE INVENTION

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and other parameters used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

A "coupling agent" is defined herein as a material having at least one group capable of reacting, binding and/or associating with a group on at least one surface. In one non-limiting embodiment, a coupling agent can serve as a molecular bridge at the interface of at least two surfaces that can be similar or dissimilar surfaces. Coupling agents, in another non-limiting embodiment, can be monomers, oligomers and/or polymers. Such materials include, but are not limited to, organo-metallics such as silanes, titanates, zirconates, aluminates, zirconium aluminates, hydrolysates thereof and mixtures thereof.

In one non-limiting embodiment, the coating composition of the present invention comprises:
(a) at least one coupling agent, at least partial hydrolysates thereof or a mixture thereof, in a concentration greater than 25 weight percent based on the weight of the total composition; and
(b) an adhesion enhancing amount of an epoxy-containing material comprising at least two epoxy groups; said coating composition being free of colloidal particles chosen from silica, alumina or a mixture thereof.

The phrase "at least partial hydrolysates thereof" is used in conjunction with coupling agents and means that at least some to all of the hydrolyzable groups on the coupling agent are hydrolyzed. The phrase "an adhesion enhancing amount of epoxy-containing material" is an amount of epoxy-containing material that when added to the coupling agent containing coating composition improves the adhesion of a subsequently applied coating or film as compared to a coupling agent containing coating composition that is free of the epoxy-containing material as measured in ASTM D-3359 Standard Test Method for Measuring Adhesion by Tape Test—Method B. The phrase "being free of colloidal particles chosen from silica, alumina or mixtures thereof" means that such colloidal particles are not added to the coating composition.

In another non-limiting embodiment, the coupling agent is a material chosen from silane coupling agents, titanate coupling agents, zirconate coupling agents, at least partial hydrolysates thereof or mixtures thereof. In a further non-limiting embodiment, the coating composition is free of colloidal particles.

Non-limiting examples of titanate coupling agents include tetra (2,2-diallyloxymethyl)butyl titanate, di(ditridecyl) phosphito titanate (commercially available as KR 55 from Kenrich Petrochemicals, Inc.); neopentyl(diallyl)oxy, trineodecanoyl titanate; neopentyl(diallyl)oxy, tri(dodecyl)benzene-sulfonyl titanate; neopentyl(diallyl)oxy, tri(dioctyl) phosphato titanate; neopentyl(diallyl)oxy, tri(dioctyl) pyrophosphato titanate; neopentyl(diallyl)oxy, tri(N-ethylenediamino)ethyl titanate; neopentyl(diallyl)oxy, tri(m-amino) phenyl titanate; neopentyl(diallyl)oxy, trihydroxy caproyl titanate; isopropyldimethylacrylisosteroyl titanate; tetraisopropyl(dioctyl) phosphito titanate; at least partial hydrolysates thereof or mixtures thereof.

Non-limiting examples of zirconate coupling agents include tetra (2,2 diallyloxymethyl)butyl, di(ditridecyl) phosphito zirconate (commercially available as KZ 55 from Kenrich Petrochemicals, Inc.); neopentyl(diallyl)oxy, trineodecanoyl zirconate; neopentyl(diallyl)oxy, tri(dodecyl)benzene-sulfonyl zirconate; neopentyl(diallyl)oxy, tri(dioctyl) phosphato zirconate; neopentyl(diallyl)oxy, tri(dioctyl)pyrophosphato zirconate; neopentyl(diallyl)oxy, tri(N-ethylenediamino)ethyl zirconate; neopentyl(diallyl)oxy, tri (m-amino)phenyl zirconate; neopentyl(diallyl)oxy, trimethacryl zirconate; neopentyl(diallyl)oxy, triacryl zirconate; dineopentyl(diallyl)oxy, di(p-amino)benzoyl zirconate; dineopentyl(diallyl)oxy, di(3-mercapto) propionic zirconate; at least partial hydrolysates thereof or mixtures thereof.

In one non-limiting embodiment, the coupling agent is a silane coupling agent represented by the following formula, at least partial hydrolysates thereof or mixtures thereof:

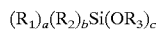

wherein each $R_1$ is an organofunctional group independently chosen for each occurrence from glycidoxy, amino, vinyl, styrl, (meth)acryloyloxy, mercapto or a hydrocarbon radical having less than 10 carbon atoms substituted with said organofunctional group; each $R_2$ is a hydrocarbon radical having less than 20 carbon atoms independently chosen for each occurrence from aliphatic radicals, aromatic radicals or mixtures of such hydrocarbon radicals; each $R_3$ is a radical having less than 20 carbon atoms independently chosen for each occurrence from monovalent aliphatic hydrocarbon radicals, aromatic hydrocarbon radicals, alkoxyalkyl radicals, acyl radicals or mixtures of such radicals; a is 1 or 2, b is 0, 1 or 2 and c is 1, 2 or 3 provided that the sum of a+b+c equals 4.

In another non-limiting embodiment, the coupling agent is a silane coupling agent wherein each $R_1$ is an organofunctional group chosen from mercapto, glycidoxy, (meth) acryloyloxy, or a hydrocarbon radical chosen from $C_1$–$C_6$ alkyl or phenyl substituted with said organofunctional group; each $R_3$ is $C_1$–$C_6$ alkyl, phenyl, acetyl or benzoyl; a is 1, b is 0 and c is 3.

Non-limiting examples of silane coupling agents include: vinyltriacetoxysilane, vinyltrimethoxysilane, vinyltri(2-methoxyethoxy)silane, vinyltriphenoxysilane, vinyltriisopropoxysilane, vinyltri-t-butoxysilane, divinyldiethoxysilane, γ-glycidoxypropyltrimethoxysilane, allyltriethoxysilane allyltrimethoxysilane, (3-acryloxypropyl) dimethylmethoxysilane, (3-acryloxypropyl) methyldimethoxysilane, (3-acryloxypropyl) trimethoxysilane, (methacryloxymethyl) dimethylethoxysilane, methacryloxymethyltriethoxysilane, methacryloxymethyltrimethoxysilane, methacryloxypropyldimethylethoxysilane, methacryloxypropyltrimethoxysilane, styrlethyltrimethoxysilane, mercaptomethylmethyldiethoxysilane, 3-mercaptopropylmethyldimethoxysilane, 3-mercaptopropyltriethoxysilane, 3-mercaptopropyltrimethoxysilane; at least partial hydrolysates thereof or mixtures thereof.

The amount of the coupling agent in the coating composition can vary widely. The amount can range from a concentration greater than 25 weight percent to a concentration equal to 100% minus the adhesion enhancing amount of an epoxy-containing material having at least 2 epoxy groups. In non-limiting alternate embodiments, the amount of coupling agent can be 30 weight percent, 50 weight percent, 75 weight percent or 95 weight percent. The amount of the coupling agent can vary between any combination of the aforementioned values, inclusive of the recited values.

In one non-limiting embodiment, the epoxy-containing material comprising at least 2 epoxy groups is chosen from materials represented by the following graphic formulae I, II or a mixture thereof:

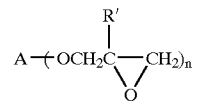

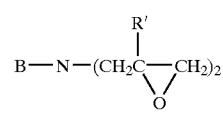

wherein
(i) R' is hydrogen or $C_1$–$C_3$ alkyl;
(ii) n is an integer chosen from 2, 3 or 4; A is chosen from $C_2$–$C_{20}$ alkylene, substituted $C_2$–$C_{20}$ alkylene, $C_3$–$C_{20}$ cycloalkylene, substituted $C_3$–$C_{20}$ cycloalkylene; the unsubstituted or substituted arylene groups, phenylene and naphthylene; aryl($C_1$–$C_3$)alkylene, substituted aryl ($C_1$–$C_3$)alkylene; the group —C(O)Z(O)C— wherein Z is $C_2$–$C_{20}$ alkylene or arylene; the group —R—(OR)$_m$— or —(OR)$_m$—, wherein R is $C_2$–$C_4$ alkylene and m is an integer from 1 to 20; phthaloyl, isophthathoyl, terephthaloyl; hydroxyl-substituted phthaloyl, hydroxy-substituted isophthaloyl, hydroxy-substituted terephthaloyl; or a group represented by the following graphic formula:

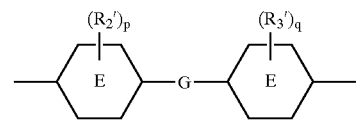

wherein $R_{2'}$ and $R_{3'}$ are each independently for each occasion chosen from $C_1$–$C_4$ alkyl, chlorine or bromine; p and q are each an integer from 0 to 4;

represents a divalent benzene group or a divalent cyclohexane group; G is —O—, —S—, —S(O$_2$)—, —C(O)—, —CH$_2$—, —CH=CH—, —C(CH$_3$)$_2$—, —C(CH$_3$) (C$_6$H$_5$)—, —(C$_6$H$_4$)— or

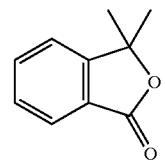  when is the divalent benzene group; or G is —O—, —S—, —CH$_2$—, or —C(CH$_3$)$_2$—, when

is the divalent cyclohexane group; said alkylene and cycloalkylene substituents being carboxy, hydroxy or $C_1$–$C_3$ alkoxy; said arylene and aryl($C_1$–$C_3$)alkylene substituents being carboxy, hydroxy, $C_1$–$C_3$ alkoxy or $C_1$–$C_3$ alkyl; and (iii) B is chosen from $C_2$–$C_{20}$ alkyl, substituted $C_2$–$C_{20}$ alkyl, $C_3$–$C_{20}$ cycloalkyl, substituted $C_3$–$C_{20}$ cycloalkyl; the unsubstituted or substituted aryl groups, phenyl and naphthyl; aryl($C_1$–$C_3$)alkyl or substituted aryl($C_1$–$C_3$)alkyl; said alkyl and cycloalkyl substituents being carboxy, hydroxy or $C_1$–$C_3$ alkoxy, said aryl and aryl($C_1$–$C_3$)alkyl substituents being carboxy, hydroxy, $C_1$–$C_3$ alkoxy or $C_1$–$C_3$ alkyl.

In another non-limiting embodiment, the epoxy-containing material is represented by graphic formula I, II or a mixture thereof wherein: R' is hydrogen; A is chosen from $C_2$–$C_{10}$ alkylene, phenylene, —R—(OR)$_m$— or —(OR)$_m$—, wherein R and m are the same as defined hereinbefore; or phthaloyl; B is chosen from $C_2$–$C_{10}$ alkyl, phenyl or phenyl ($C_1$–$C_3$)alkyl.

Non-limiting examples of the epoxy-containing material comprising at least 2 epoxy groups are chosen from: glycerol polyglycidyl ether; diglycerol polyglycidyl ether; glycerol propoxylate triglycidyl ether; trimethylolpropane triglycidyl ether; sorbitol polyglycidyl ether; poly(ethylene glycol)diglycidyl ether; poly(propylene glycol)diglycidyl ether; neopentyl glycol diglycidyl ether; N,N-diglycidyl-4-glycidyloxyaniline; N,N'-diglycidyltoluidine; 1,6-hexane diol diglycidyl ether; diglycidyl 1,2-cyclohexanedicarboxylate; diglycidyl bisphenol A; a polymer of diglycidyl bisphenol A; poly(bisphenol A-co-epichlorohydrin), glycidyl end-capped; diglycidyl of a hydrogenated bisphenol A propylene oxide adduct; diglycidyl ester of terephthalic acid; diglycidyl 1,2,3,6-tetrahydrophthalate; spiroglycoldiglycidyl ether; hydroquinone diglycidyl ether or mixtures thereof.

The amount of epoxy-containing material is an adhesion enhancing amount which was defined hereinbefore. This amount can vary widely. In non-limiting alternate embodiments, the amount can range from 3 to 60 weight percent, from 5 to 50 weight percent, or from 10 to 30 weight percent. The amount can also be less than 3 weight percent and more than 60 weight percent. The amount of the epoxy-containing material can vary between any combination of the aforementioned values, inclusive of the recited values.

In one non-limiting embodiment, the presence of water, e.g., moisture, may not be necessary to obtain hydrolysis of the coupling agent, e.g., organofunctional silane. It is believed that transesterification of the hydrolyzable group of the coupling agent can occur with reactive groups produced on the surface. In another non-limiting embodiment, water can be provided in an amount necessary for the hydrolysis of the organofunctional coupling agent, e.g., a coupling agent-hydrolyzing amount. For example, this amount is usually at least 1.5 moles of water per mole of silane, specifically, 0.5 grams of water is needed to hydrolyze 5 grams of methacryloxypropyl trimethoxysilane. In a further non-limiting embodiment, atmospheric moisture, if sufficient, can be adequate, but it is contemplated that water can be added to the coating composition.

In one non-limiting embodiment, the coating composition of the present invention further comprising a catalyst chosen from an acidic material, a material, different from the acidic material, adapted to generate acid upon exposure to actinic radiation or a mixture thereof. In another non-limiting embodiment, the acidic material is chosen from an organic acid, inorganic acid or mixture thereof. In a further non-limiting embodiment, the acidic material is chosen from acetic, formic, glutaric, maleic, nitric, hydrochloric, phosphoric, hydrofluoric, sulfuric acid or mixtures thereof.

Any material, e.g., compound, that generates an acid on exposure to actinic radiation can be used in the coating composition of the present invention. Such compounds are known to those skilled in the art. In one non-limiting embodiment, the acid generated can be a Lewis acid or a Bronsted acid. Non-limiting examples of acid generating compounds include onium salts and iodosyl salts, aromatic diazonium salts, metallocenium salts, o-nitrobenzaldehyde, the polyoxymethylene polymers described in U.S. Pat. No. 3,991,033, the o-nitrocarbinol esters described in U.S. Pat. No. 3,849,137, the o-nitrophenyl acetals, their polyesters and end-capped derivatives described in U.S. Pat. No. 4,086,210, sulphonate esters or aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain, such as those described in U.S. Pat. No. 4,368,253. Examples of these radiation activated acid catalysts are also disclosed in U.S. Pat. No. 5,451,345.

In one non-limiting embodiment, the acid generating compound is a cationic photoinitiator such as an onium salt. Non-limiting examples of such materials include diaryliodonium salts and triarylsulfonium salts, which are commerically available as SarCat® CD-1012 and CD-1011 from Sartomer Company. Other suitable onium salts are described in U.S. Pat. No. 5,639,802, column 8, line 59 to column 10, line 46. Examples of such onium salts include 4,4'-dimethyldiphenyliodonium tetrafluoroborate, phenyl-4-octyloxyphenyl phenyliodonium hexafluoroantimonate, dodecyldiphenyl iodonium hexafluoroantimonate, [4-[(2-tetradecanol)oxy] phenyl]phenyl iodonium hexafluoroantimonate and mixtures thereof.

The amount of catalytic and/or photo-initiating material chosen from an acidic material, acid generating material, e.g., photochemical reaction catalyst and/or photoinitiator, or mixture thereof used in the adhesion enhancing coating composition will vary widely and depend on the particular materials used. Only the amount required to catalyze and/or initiate the reaction between the coupling agent and the surface groups is required, e.g., a catalyzing amount. In one non-limiting embodiment, the acidic material and/or acid generating material can be used in an amount from 0.01% to 5% by weight, based on the total weight of the composition.

The coating composition of the present invention further comprises at least one photosensitive dye. In one non-limiting embodiment, the aforementioned onium salts can be used in combination with photosensitive dyes such as acridine and benzoflavin cationic dyes, benzophenone type basic dyes, perylene type, and fluorone type dyes described in U.S. Pat. No. 5,639,802. The benefits of such a combination is that the wavelength of actinic radiation necessary to cause the release of acid is increased in the direction toward the visible spectrum, e.g., away from shorter ultraviolet wavelengths that are harmful to humans. An example of a fluorone dye is 2,4-diiodo-6-butoxy-3-fluorone.

The coating composition of the present invention, in one non-limiting embodiment, further comprisies at least one material having at least one (meth)acrylic group, e.g., an acrylic or a methacrylic group, and at least one carboxylic group. In another non-limiting embodiment, the material comprising at least one (meth)acrylic group and at least one carboxylic group is represented by the following formula:

$$CH_2=C(R_4)C(O)OR_5OC(O)CR_6R_7CR_8R_9(CR_{10}R_{11})_d-COOH$$

wherein $R_4$ is hydrogen or methyl, $R_5$ is a substituted or unsubstituted alkylene group having from 2 to 6 carbon atoms, and $R_6$, $R_7$, $R_8$, $R_9$, $R_{10}$ and $R_{11}$ are independently chosen for each occasion from hydrogen, straight or branched chain, saturated or unsaturated aliphatic, cycloaliphatic or polycycloaliphatic groups having from 1 to 20 carbon atoms and d is chosen from 0 or 1. Non-limiting examples of the material comprising at least one (meth) acrylic group and at least one carboxylic group are chosen from mono-2-(acryloyloxy)ethyl succinate, mono-2-(methacryloyloxy)ethyl phthalate, mono-2-(methacryloyloxy) ethyl maleate, mono-2-(methacryloyloxy)ethyl succinate or mixtures thereof.

The coating composition of the present invention, further comprises, in another non-limiting embodiment, a material represented by the following formula, hydrolysates thereof or mixtures thereof:

$$(R_{12})_eMX_{(4-e)}$$

wherein M is chosen from silicon, titanium or zirconium, X is independently chosen for each occasion from halogen, alkoxy groups of from 1 to 12 carbon atoms or acyloxy groups of from 1 to 12 carbon atoms, $R_{12}$ is independently chosen for each occasion from alkoxy groups of from 1 to 12 carbon atoms, aliphatic hydrocarbon groups of from 1 to 12 carbon atoms, or acyloxy groups of from 1 to 12 carbon atoms, and e is the integer 1, 2, or 3.

In a further non-limiting embodiment, the coating composition further comprises a material represented by the aforementioned formula wherein M is silicon, X is independently chosen for each occurrence from alkoxy groups of from 1 to 6 carbon atoms or acyloxy groups of from 1 to 6 carbon atoms; $R_{12}$ is independently chosen for each occurrence from alkoxy groups of from 1 to 6 carbon atoms or aliphatic hydrocarbon groups of from 1 to 6 carbon atoms; and e is the integer 1 or 2.

Non-limiting examples of materials represented by the aforementioned formula include methyltrimethoxysilane, methyl-triethoxysilane, methyltriacetoxysilane, methyltripropoxysilane, methyltributoxysilane, ethyltrimethoxysilane, ethyltriethoxysilane, dimethyldiethoxysilane, tetramethoxysilane, tetraethoxysilane, tetra-n-propoxysilane, tetra-n-butoxysilane, tetra($C_1$–$C_{18}$)alkoxy titanates, methyl triethoxy titanium (iv), methyl titanium (iv) triisopropoxide, methyl titanium (iv) tributoxide, methyl titanium (iv) tri-t-butoxide, isopropyl titanium (iv) tributoxide, butyl titanium (iv) triethoxide, butyl titanium (iv) tributoxide, phenyl titanium (iv) triisopropoxide, phenyl titanium (iv) tributoxide, phenyl titanium (iv) triisobutoxide, [Ti(CH$_2$Ph)$_3$(NC$_5$H$_{10}$)], [Ti(CH$_2$SiMe$_3$)$_2$(NEt$_2$)$_2$], tetra($C_1$–$C_{18}$)alkoxy zirconates, phenyl zirconium (iv) trichloride, methyl zirconium (iv) trichloride, ethyl zirconium (iv) trichloride, propyl zirconium (iv) trichloride, methyl zirconium (iv) tribromide, ethyl zirconium (iv) tribromide, propyl zirconium (iv) tribromide, chlorotripentyl zirconium (iv), hydrolysates thereof, or mixtures thereof.

The coating composition of the present invention can further comprise additional conventional ingredients which impart desired characteristics to the composition, or which are required for the process used to apply and cure the composition on the substrate or which enhance the cured coating made therefrom. In one non-limiting embodiment, such additional ingredients can include catalysts, e.g., such as photoinitiators, solvents, light stabilizers, heat stabilizers, mold release agents, rheology control agents, leveling agents, e.g., surfactants, free radical scavengers, adhesion promoters such as hexanediol diacrylate and other conventional ingredients.

In one non-limiting embodiment, photoinitiators that can be present in the coating composition of the present invention are classified in two major groups based upon a mode of action. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265 which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Non-limiting examples of solvents that can be present in the coating composition of the present invention are those that will dissolve the solid components of the coating composition, that are compatible with it and ensure uniform coverage of the surface to which the coating composition is applied. For example, solvents having reactive amino groups could be incompatible with the acid generating material. The minimum amount of solvent present in the coating composition is a solvating amount, e.g., an amount that is sufficient to solubilize the solid components of the coating composition and provide uniform coverage of the surface. The maximum amount of solvent that can be present is an amount that still enables preparation of an adhesion enhancing surface demonstrating improved adhesion for a subsequently applied coating. Economics and environmental considerations usually demand that solvent levels are kept low.

Potential solvents include, but are not limited to, the following: benzene, toluene, methyl ethyl ketone, methyl isobutyl ketone, acetone, isopropyl alcohol, propylene carbonate, 2-methoxyethyl ether, xylene, cyclohexane, 3-methyl cyclohexanone, ethyl acetate, butyl acetate, tetrahydroduran, amyl propionate, methyl propionate, propylene glycol methyl ether, dimethyl sulfoxide, dimethyl formamide, diethylene glycol dibenzoate, dialkyl ethers of ethylene glycol, e.g., diethylene glycol dimethyl ether and their derivates (sold as CELLOSOLVE industrial solvents) and mixtures thereof.

In one non-limiting embodiment, the process of the present invention for producing a substantially adherent polymeric coating on a substrate comprises:
  (a) obtaining a substrate;
  (b) applying to said substrate (a) an at least partial coating of a coating composition adapted to enhance the adhesion of a coating to a substrate comprising:
    i) at least one coupling agent, at least partial hydrolysates thereof, or mixtures thereof in a concentration greater than 25 weight percent based on the total weight of the total composition; and
    ii) an adhesion enhancing amount of an epoxy-containing material comprising at least 2 epoxy groups; said coating composition being free of colloidal particles chosen from silica, alumina or a mixture thereof;
  (c) applying to the adhesion enhancing coating an at least partial coating of a polymeric coating composition, different from the adhesion enhancing coating; and
  (d) at least partially curing the coated substrate.

The phrase "a substantially adherent polymeric coating" means that at least 10 percent of the coating remains after the dry adhesion test is performed in ASTM D-3359 Standard Test Method for Measuring Adhesion by Tape Test—Method B.

The phrase "an at least partial coating or an at least partial covering with a film" means an amount of coating or film covering from a portion to the complete surface of the substrate. The phrase "an at least partially cured coating" refers to a coating in which the curable or cross-linkable components are at least partially cured, crosslinked and/or reacted. In alternate non-limiting embodiments of the present invention, the degree of reacted components can vary widely, e.g., from 5% to 100% of all the possible curable, crosslinkable and/or reactable components.

In another non-limiting embodiment, the coupling agent is chosen from silane coupling agents, titinate coupling agents, zirconate coupling agents, hydrolysates thereof or mixtures thereof.

Application of the adhesion enhancing coating can be by any of the methods used in coating technology. Non-limiting examples include: spray coating, spin coating, spin and spray coating, spread coating, dip coating, casting or roll-coating. In a series of non-limiting embodiments, the coating composition of the present invention can be used as a surface modifying treatment in which the thickness of the coating can be one or several mono-molecular layers thick, as a primer having a thickness of from 0.1 to 10 microns thick, as a coating having a thickness that can vary widely. In the latter case, the coating composition can be used, in one non-limiting embodiment, as a protective coating to which subsequent coatings are not applied.

In a further non-limiting embodiment, the process of the present invention further comprises at least partially curing the adhesion enhancing coating before applying an at least partial coating of a polymeric coating composition.

In a still further non-limiting embodiment the at least partial curing of the coated substrate is done by exposure to actinic radiation, thermally or a combination thereof. Depending on the substrate and components selected for the coating composition of the present invention, the coating may be cured by exposure to actinic radiation, by thermal polymerization, e.g. at temperatures, in one non-limiting embodiment, ranging from 22° C. to 200° C., or a combination of the two methods. In another non-limiting embodiment, temperatures of between 80° C. and a temperature above which the substrate is damaged due to heating, e.g., from 80° C. to 200° C., can be used. In a further non-limiting embodiment, certain organic polymeric materials can be heated up to 130° C. for a period of 1 to 16 hours in order to cure the coating without causing damage to the substrate.

While a range of temperatures has been described for thermally curing the coated substrate, it will be recognized by persons skilled in the art that temperatures other than those disclosed herein can be used. Curing of the adhesion enhancing coating composition can be accomplished by irradiating the coating with ultraviolet and/or visible light so as to initiate the release of acid by the materials in the coating composition. The step of exposing the coated substrate to actinic radiation can be followed by a heating step.

In a still further non-limiting embodiment, the process of the present invention further comprises pretreating the substrate to produce surface reactive groups by:

(a) cleaning said substrate;
(b) exposing said substrate to strong alkali, activated gas, ionizing radiation or a combination thereof;
(c) at least partially applying a primer composition adapted to receive a subsequently applied coating to said substrate; or
(d) a combination thereof.

In one non-limiting embodiment, pretreatment methods include ultrasonic washing, cleaning with an aqueous solution of detergent or an aqueous mixture of organic solvent, e.g., a 50:50 mixture of isopropanol:water or ethanol:water, UV treatment, activated gas treatment, e.g., treatment with low temperature plasma or corona discharge, and chemical treatment that results in hydroxylation of the substrate surface, e.g., etching of the surface with an aqueous solution of alkali metal hydroxide, e.g., sodium or potassium hydroxide, which solution can also contain a fluorosurfactant. Generally, the alkali metal hydroxide solution is a dilute aqueous solution. In a series of non-limiting embodiments, a solution of from 5 to 40 weight percent, more typically from 10 to 15 weight percent, or 12 weight percent, alkali metal hydroxide can be used. See, for example, U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

In an alternate non-limiting embodiment, a primer coating is applied to the surface of the substrate before application of the coating composition. The primer coating is interposed between the substrate and the adhesion enhancing coating, and serves as a barrier coating to prevent interaction of the adhesion enhancing coating components with the substrate and vice versa, and/or as an adhesive layer to promote adhesion of the adhesion enhancing coating to the substrate. The primer can be applied to the substrate by any of the methods known in the art, e.g., spray, spin, spread, curtain, roll or dip coating; and can be applied to a cleaned and untreated or cleaned and treated, e.g., chemically treated, surface of the substrate.

Primer coatings are well known to those skilled in the art. Selection of an appropriate primer coating will depend on the substrate used and the particular adhesion enhancing coating, e.g., the primer coating must be chemically and physically compatible with the surface of the substrate and the adhesion enhancing coating, while providing the functional benefits desired for the primer coating, e.g., barrier and adhesive properties.

The thickness of the primer coating may vary widely. In a series of non-limiting embodiments, it can be a surface modifying primer treatment that is one or several monomolecular layers thick, it can range from 0.1 to 10 microns, more usually from 0.1 to 2 or 3 microns. The thickness of the primer can vary between any combination of the aforementioned values, inclusive of the recited values.

In one non-limiting embodiments, the polymeric coating composition to be applied to the adhesion enhancing coating is chosen from a thermoplastic or thermosetting coating composition. In another non-limiting embodiment, the polymeric coating composition is a thermosetting coating composition chosen from polyurethanes, aminoplast resins, poly(meth)acrylates, polyanhydrides, polyacrylamides, epoxy resins or polysilanes.

The various coating compositions described below are well known and are made with components and according to methods well understood and appreciated by those skilled in the art. Non-limiting substrates for the application of adhesion promoting coatings and any subsequent coatings include any type of substrate. Non-limiting examples include, paper, glass, ceramics, wood, masonry, textiles, metals and polymeric organic host materials.

The photochromic polyurethane coatings that can be used to prepare the photochromic coated articles of the present invention, in one non-limiting embodiment, can be produced by the catalyzed or uncatalyzed reaction of an organic polyol component and an isocyanate component in the presence of photochromic compound(s). Materials and methods for the preparation of polyurethanes are described in *Ullmann's Encyclopedia of Industrial Chemistry*, Fifth Edition, 1992, Vol. A21, pages 665 to 716. Non-limiting examples of methods and materials, e.g., organic polyols, isocyanates and other components, which can be used to prepare the polyurethane coating are disclosed in U.S. Pat. Nos. 4,889,413 and 6,187,444B1.

The photochromic aminoplast resin coating composition that can be used to produce the photochromic coated articles of the present invention, in one non-limiting embodiment, can be prepared by combining a photochromic material with the reaction product of a functional component(s) having at least two functional groups chosen from hydroxyl, carbamate, urea or a mixture thereof and an aminoplast resin, e.g., crosslinking agent as described in U.S. Pat. Nos. 4,756,973, 6,432,544B1 and 6,506,488.

Photochromic polysilane coating compositions contemplated for use in preparing the photochromic coated articles of the present invention, in one non-limiting embodiment, are prepared by hydrolyzing at least one silane monomer such as glycidoxypropyltrimethoxysilane, vinyltrimethoxysilane, methacryloxypropyltrimethoxysilane, tetramethoxysilane, tetraethoxysilane and/or methyltrimethoxysilane and combining the hydrolyzate with at least one photochromic material as described in U.S. Pat. No. 4,556,605.

Photochromic poly(meth)acrylate coating compositions contemplated for use in preparing the photochromic coated articles of the present invention can be prepared, in one non-limiting embodiment, by combining photochromic materials(s) with mono-, di- or multi-functional (meth)acrylates as described in U.S. Pat. Nos. 6,025,026 and 6,150,430 and WO publication 01/02449 A2.

The polyanhydride photochromic coating composition that can be used to prepare the photochromic coated articles of the present invention can be prepared in one non-limiting embodiment, by the reaction of a hydroxyl-functional component and a polymeric anhydride-functional component in a composition including at least one organic photochromic material as described in U.S. Pat. No. 6,432,544B1. Non-limiting examples of hydroxyl-functional components, anhydride-functional component(s) and other components that can be used to prepare the polyanhydride photochromic coatings are disclosed in U.S. Pat. Nos. 4,798,745, 4,798,746 and 5,239,012.

Photochromic polyacrylamide coating compositions contemplated for use in preparing the photochromic coated articles of the present invention, in one non-limiting embodiment, can be prepared by combining a photochromic material with the free radical initiated reaction product of a polymerizable ethylenically unsaturated composition comprising N-alkoxymethyl(meth)acrylamide and at least one other copolymerizable ethylenically unsaturated monomer as described in U.S. Pat. No. 6,060,001. Methods for preparing N-alloxymethyl(meth)acrylamide functional polymer are described in U.S. Pat. No. 5,618,586.

The photochromic epoxy resin coating compositions that can be used to prepare the photochromic coated articles of the present invention, in one non-limiting embodiment, can be prepared by combining photochromic compound(s), epoxy resins or polyepoxides and curing agents as described in U.S. Pat. Nos. 4,756,973 and 6,268,055B1.

In another non-limiting embodiment, the types of polymeric coatings with or without photochromic compounds include: paints, e.g., a pigmented liquid or paste used for the decoration, protection and/or the identification of a substrate; and inks, e.g., a pigmented liquid or paste used for writing and printing on substrates such as in producing verification marks on security documents, e.g., documents such as banknotes, passport and drivers' licenses, for which authentication or verification of authenticity may be desired.

Application of the polymeric coating can be by any of the methods used in coating technology, non-limiting examples include, spray coating, spin coating, spin and spray coating, spread coating, curtain coating, dip coating, casting or roll-coating and methods used in preparing overlays, such as the method of the type described in U.S. Pat. No. 4,873,029. The application method selected also depends on the thickness of the desired coating.

The thickness of the coatings on the photochromic and non-photochromic articles of the present invention can vary widely. Coatings having a thickness ranging from 1 to 50 microns can be applied by the methods used in coating technology. Coating of a thickness greater than 50 microns can require the application of multiple coatings or molding methods typically used for overlays. In alternate non-limiting embodiments, the coating can range in thickness from 1 to 10,000 microns, from 5 to 1000, from 8 to 400 or from 10 to 250 microns. The thickness of the polymeric coating can range between any combination of these values, inclusive of the recited range, e.g., a thickness of from 20 to 200 microns.

Following application of the polymeric coating to the surface of the substrate, in one non-limiting embodiment, the coating is at least partially cured. In another non-limiting embodiment, the methods used for curing the photochromic polymeric coating include the methods used for curing the adhesion enhancing coating. Such methods include radical polymerization, thermal polymerization, photopolymerization or a combination thereof. Additional non-limiting methods include irradiating the host material with infrared, ultraviolet, gamma or electron radiation so as to initiate the polymerization reaction of the polymerizable components. This can be followed by a heating step.

The use of protective coatings, some of which can contain polymer-forming organosilanes, as primers to improve adhesion of subsequently applied coatings is known in the art. In one non-limiting embodiment, non-tintable coatings are used. Non-limiting examples of commercial coating products include SILVUE® 124 and HI-GARD® coatings, available from SDC Coatings, Inc. and PPG Industries, Inc., respectively. In addition, depending on the intended use of the coated article, in one non-limiting embodiment, it can be necessary to apply an appropriate protective coating(s), such as an abrasion resistant coating and/or coatings that can serve as oxygen barriers, onto the exposed surface of the coating composition to prevent scratches from the effects of friction and abrasion and interactions of oxygen with the photochromic compounds, respectively.

The phrase "an at least partially abrasion resistant coating or film" refers to a coating or film that demonstrates a resistance to abrasion that is greater than the standard reference material, typically a plastic made of CR-39® monomer available from PPG Industries, Inc, as tested in a method comparable to ASTM F-735 Standard Test Method for Abrasion Resistance of Transparent Plastics and Coatings Using the Oscillating Sand Method.

Non-limiting examples of protective coatings also known as hardcoats include those based on inorganic materials such as silica, titania and/or zirconia as well as organic hardcoats of the type that are ultraviolet light curable. In one non-limiting embodiment, such protective coatings can be applied to the surface of articles comprising at least partially cured polymers which can contain photochromic materials.

In one non-limiting embodiment, the process of the present invention further comprises applying to the at least partially cured coated substrate to which the adhesion enhancing composition and the photochromic polymeric coating composition have been applied, an at least partial coating of an (meth)acrylate based radiation curable coating composition.

In another non-limiting embodiment the (meth)acrylate based radiation curable coating composition is one that upon curing exhibits:

(a) resistance to removal by aqueous solutions of alkali metal hydroxide;

(b) compatibility with at least partially abrasion resistant coatings; and (c) more abrasion resistance than the at least partially cured coating on said substrate.

In a further non-limiting embodiment, the radiation-cured, (meth)acrylate-based protective coating applied to the polymeric coating can be transparent, e.g., optically clear, when used for ophthalmic applications, so as not to interfere with the photochromic function when photochromic materials are present, can adhere firmly to the polymeric coating, be resistant to removal by aqueous inorganic caustic, e.g., alkali metal hydroxide, can be scratch resistant relative to the polymeric coating, and can be compatible with abrasion resistant coatings containing organo silane(s). The (meth)acrylate-based coating can consist of a single coating, or comprise two or more coatings of the same or different compositions.

The (meth)acrylate-based coating can be prepared using acrylic or methacrylic monomers or a mixture of acrylic and/or methacrylic monomers (hereinafter referred to collectively as (meth)acrylic monomers). In one non-limiting embodiment, the mixture of (meth)acrylic monomers can include mono-, di-, tri-, tetra-, and penta-acrylic functional monomers. Additional co-polymerizable monomers, such as epoxy monomers, e.g., monomers containing an epoxy functionality, monomers containing both acrylic and epoxy functionalities, etc., can also be present in the formulation used to prepare the (meth)acrylate-based coating, as described subsequently herein. The monomers used to prepare the (meth)acrylate-based coating are comprised of a plurality, e.g., a major amount, such as more than 50 weight percent, of (meth)acrylic-functional monomers; hence the designation "(meth)acrylate-based coating".

In another non-limiting embodiment, the formulations used to prepare the (meth)acrylate-based coating can also contain components having at least one isocyanate functionality, e.g., organic monoisocyanates and organic diisocyanates, thereby to incorporate polyurethane groups into the coating. The (meth)acrylate-based coating used in the present invention can possess the following physical properties: namely, be transparent, can adhere to the polymeric coating, can be resistant to removal by aqueous alkali metal hydroxide, can be compatible with an abrasion-resistant coating comprising organo silane that is applied to its surface, and can be more scratch resistant than the polymeric coating, e.g., be harder than the polymeric coating. One skilled in the art can readily determine if the (meth)acrylate-based coating meets these physical requirements by following the standard test protocols described in the description of the examples in pending U.S. patent application Ser. No. 10/229,773 filed Aug. 28, 2002 which disclosure is incorporated herein by reference.

In one non-limiting embodiment, the article to which the radiation-cured, (meth)acrylate-based protective coating is applied further comprises a protective coating.

In another non-limiting embodiment, the article of the present invention comprises a substrate to which a primer is applied followed by the adhesion enhancing coating followed by a photochromic polymeric coating and protective coatings. In a further non-limiting embodiment, the protective coatings are a radiation-cured, (meth)acrylate-based protective coating to which is applied an organosilane protective coating. In a still further non-limiting embodiment, the organosilane protective coating is applied directly to the photochromic polymeric coating without an interposing radiation-cured, (meth)acrylate-based protective coating.

In additional non-limiting embodiments, other coatings or surface treatments, e.g., a tintable coating, an at least partially antireflective surface, etc., can also be applied to the articles of the present invention. The phrase "an at least partially antireflective surface" is a coating or film that at least partially improves the antireflective nature of the substrate to which it is applied by reducing the amount of glare reflected by the surface of the substrate and for transparent substrates by increasing the percent transmittance as compared to an uncoated substrate. The improvement in percent transmittance can range from 1 to 9 percent above the uncoated substrate. Put another way, the percent transmittance of the antireflective coated transparent substrate can range from a percentage greater than the uncoated surface up to 99.9.

An antireflective surface or coating, e.g., a monolayer or multilayer of metal oxides, metal fluorides, or other such materials, can be deposited onto the articles, e.g., lenses, of the present invention through vacuum evaporation, sputtering, or some other method.

In a further non-limiting embodiment, the article comprising an at least partially cured adhesion promoting coating further comprises a superstrate, e.g., a film or sheet comprising at least one organic polymeric material. In one non-limiting embodiment, the photochromic material can be located in the superstrate. In another non-limiting embodiment, the superstrate can be an at least partially polarizing film. The phrase "an at least partially polarizing film" is one that reduces the amount of glare by 5 to 100 percent of all the glare that would be produced if the polarizing film was not present.

The organic polymeric material of the superstrate is the same as the organic polymeric material described hereinafter as the substrate or host material. Non-limiting examples of the organic polymeric materials include thermosetting or thermoplastic materials, for example a thermoplastic polyurethane superstrate.

In a still further non-limiting embodiment, the superstrate can be adherringly bonded to the substrate by the adhesion promoting coating composition. Non-limiting conditions for applying a superstrate to a substrate include applying pressure of from 150 to 400 pounds per square inch (psi) (1034 to 2758 kPa) which can be done while heating the substrate. Sub-atmospheric pressures, e.g., a vacuum, can also be applied to draw down and conform the superstrate to the shape of the substrate as known to those skilled in the art. Non-limiting examples include applying at a sub-atmospheric pressure within the range of from 0.001 mm Hg to 20 mm Hg (0.13 Pa to 2.7 kPa).

After a superstrate is applied to at least one surface of a substrate having the adhesion promoting coating, in one non-limiting embodiment, it can further comprise a protective coating or film superposed onto the superstrate. Such a protective coating or film, in one non-limiting embodiment, serves as an at least partially abrasion resistant coating or film. In another non-limiting embodiment, the superstrate and protective film can be combined as a laminate which can be applied with the protective coating on the outer surface of the laminated substrate.

Non-limiting types of protective coatings include the aforedescribed hardcoats that are curable by ultraviolet radiation and/or that contain organosilanes. The thickness of the protective coating can vary widely and include the aforementioned range for the photochromic polymeric coatings. Non-limiting types of protective films include those made of organic polymeric materials such as thermosetting and thermoplastic materials. In another non-limiting embodiment, the protective film is a thermoplastic film made of polycarbonate. The thickness of the protective film or sheet can vary widely. Typically, such films have a thickness of from 1 to 20 mils (0.025 to 0.5 mm).

In one non-limiting embodiment, the substrate is a polymeric organic material that can be a solid transparent or optically clear material, e.g., materials having a luminous transmittance of at least 70 percent and are suitable for optical applications, such as optical elements chosen from plano and ophthalmic lenses, windows, automotive transparencies, e.g., windshields, aircraft transparencies, plastic sheeting, polymeric films, etc.

Non-limiting examples of polymeric organic materials which can be used as a substrate for the articles of the present invention include: poly(meth)acrylates, polyurethanes, polythiourethanes, thermoplastic polycarbonates, polyesters, poly(ethylene terephthalate), polystyrene, poly(alpha methylstyrene), copoly(styrene-methyl methacrylate), copoly(styrene-acrylonitrile), polyvinylbutyral, poly(vinyl acetate), cellulose acetate, cellulose propionate, cellulose butyrate, cellulose acetate butyrate, polystyrene or polymers, such as homopolymers and copolymers prepared by polymerizing monomers chosen from bis(allyl carbonate) monomers, styrene monomers, diisopropenyl benzene monomers, vinylbenzene monomers, e.g., those described in U.S. Pat. No. 5,475,074, diallylidene pentaerythritol monomers, polyol (allyl carbonate) monomers, e.g., diethylene glycol bis(allyl carbonate), vinyl acetate monomers, acrylonitrile monomers, mono- or polyfunctional, e.g., di- or multi-functional, (meth)acrylate monomers such as ($C_1$–$C_{12}$)alkyl (meth)acrylates, e.g., methyl (meth)acrylate, ethyl (meth)acrylate, butyl (meth)acrylate etc., poly(oxyalkylene)(meth)acrylate, poly(alkoxylated phenol (meth)acrylates), diethylene glycol (meth)acrylates, ethoxylated bisphenol A (meth)acrylates, ethylene glycol (meth)acrylates, poly(ethylene glycol) (meth)acrylates, ethoxylated phenol (meth)acrylates, alkoxylated polyhydric alcohol (meth)acrylates, e.g., ethoxylated trimethylol propane triacrylate monomers, urethane(meth)acrylate monomers, such as those described in U.S. Pat. No. 5,373,033, or a mixture thereof. Further examples of polymeric organic materials are disclosed in the U.S. Pat. No. 5,753,146, column 8, line 62 to column 10, line 34.

In another non-limiting embodiment, transparent copolymers and blends of transparent polymers are also suitable as polymeric materials. The material can be an optically clear polymerized organic material prepared from a thermoplastic polycarbonate resin, such as the carbonate-linked resin derived from bisphenol A and phosgene, which is sold under the trademark, LEXAN; a polyester, such as the material sold under the trademark, MYLAR; a poly(methyl methacrylate), such as the material sold under the trademark, PLEXIGLAS; polymerizates of a polyol(allyl carbonate) monomer, especially diethylene glycol bis(allyl carbonate), which monomer is sold under the trademark CR-39, and polymerizates of copolymers of a polyol (allyl carbonate), e.g., diethylene glycol bis(allyl carbonate), with other copolymerizable monomeric materials, and copolymers with a polyurethane having terminal diacrylate functionality, as described in U.S. Pat. Nos. 4,360,653 and 4,994,208; and copolymers with aliphatic urethanes, the terminal portion of which contain allyl or acrylyl functional groups, as described in U.S. Pat. No. 5,200,483.

In one non-limiting embodiment, the photochromic materials that can be included in the polymeric coating or polymeric film can include the following classes of materials: chromenes, e.g., naphthopyrans, benzopyrans, indenonaphthopyrans and phenanthropyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans; oxazines, e.g., spiro(indoline) naphthoxazines, spiro(indoline)pyridobenzoxazines, spiro(benzindoline)pyridobenzoxazines, spiro(benzindoline) naphthoxazines and spiro(indoline)benzoxazines; mercury dithizonates, fulgides, fulgimides and mixtures of such photochromic compounds.

Such photochromic compounds and complementary photochromic compounds are described in U.S. Pat. No. 4,931,220 at column 8, line 52 to column 22, line 40; U.S. Pat. No. 5,645,767 at column 1, line 10 to column 12, line 57; U.S. Pat. No. 5,658,501 at column 1, line 64 to column 13, line 17; U.S. Pat. No. 6,153,126 at column 2, line 18 to column 8, line 60; U.S. Pat. No. 6,296,785 at column 2, line 47 to column 31, line 5; U.S. Pat. No. 6,348,604 at column 3, line 26 to column 17, line 15; and U.S. Pat. No. 6,353,102 at column 1, line 62 to column 11, line 64, the disclosures of the aforementioned patents are incorporated herein by reference. Spiro(indoline)pyrans are also described in the text, *Techniques in Chemistry*, Volume III, "Photochromism", Chapter 3, Glenn H. Brown, Editor, John Wiley and Sons, Inc., New York, 1971.

In another non-limiting embodiment, polymerizable photochromic materials, such as polymerizable naphthoxazines disclosed in U.S. Pat. No. 5,166,345 at column 3, line 36 to column 14, line 3; polymerizable spirobenzopyrans disclosed in U.S. Pat. No. 5,236,958 at column 1, line 45 to column 6, line 65; polymerizable spirobenzopyrans and spirobenzothiopyrans disclosed in U.S. Pat. No. 5,252,742 at column 1, line 45 to column 6, line 65; polymerizable fulgides disclosed in U.S. Pat. No. 5,359,085 at column 5, line 25 to column 19, line 55; polymerizable naphthacenediones disclosed in U.S. Pat. No. 5,488,119 at column 1, line 29 to column 7, line 65; polymerizable spirooxazines disclosed in U.S. Pat. No. 5,821,287 at column 3, line 5 to column 11, line 39; polymerizable polyalkoxylated naphthopyrans disclosed in U.S. Pat. No. 6,113,814 at column 2, line 23 to column 23, line 29; and the polymerizable photochromic compounds disclosed in WO97/05213 and U.S. patent application Ser. No. 09/828,260 filed Apr. 6, 2001 can be used. The disclosures of the aforementioned patents on polymerizable photochromic materials are incorporated herein by reference.

Other non-limiting embodiments of photochromic materials that can be used include organo-metal dithiozonates, e.g., (arylazo)-thioformic arylhydrazidates, e.g., mercury dithizonates which are described in, for example, U.S. Pat.

No. 3,361,706 at column 2, line 27 to column 8, line 43; and fulgides and fulgimides, e.g., the 3-furyl and 3-thienyl fulgides and fulgimides, which are described in U.S. Pat. No. 4,931,220 at column 1, line 39 through column 22, line 41, the disclosures of which are incorporated herein by reference.

An additional non-limiting embodiment is a form of organic photochromic material resistant to the effects of a polymerization initiator that can also be used in the photochromic articles of the present invention. Such organic photochromic materials include photochromic compounds encapsulated in metal oxides, the latter of which are described in U.S. Pat. Nos. 4,166,043 and 4,367,170 at column 1 line 36 to column 7, line 12, which disclosure is incorporated herein by reference.

In another non-limiting embodiment, inorganic photochromic systems contemplated for use typically contain crystallites of silver halide, cadmium halide and/or copper halide. Other non-limiting inorganic photochromic glass systems can be prepared by the addition of europium (II) and/or cerium(III) to a soda-silica glass. Such inorganic photochromic glass systems are described in Kirk Othmer Encyclopedia of Chemical Technology, 4th Edition, Volume 6, pages 322–325, which disclosure is incorporated herein by reference.

The photochromic materials described herein can be chosen from a variety of materials. Non-limiting examples include: of course, a single photochromic compound; a mixture of photochromic compounds; a material comprising at least one photochromic compound, such as a plastic polymeric resin or an organic monomeric or oligomeric solution; a material such as a monomer or polymer to which at least one photochromic compound is chemically bonded; a material comprising and/or having chemically bonded to it at least one photochromic compound, the outer surface of the material being encapsulated (encapsulation is a form of coating), for example with a polymeric resin or a protective coating such as a metal oxide that prevents contact of the photochromic material with external materials such as oxygen, moisture and/or chemicals that have a negative effect on the photochromic material, such materials can be formed into a particulate prior to applying the protective coating as described in U.S. Pat. Nos. 4,166,043 and 4,367,170; a photochromic polymer, e.g., a photochromic polymer comprising photochromic compounds bonded together; or mixtures thereof.

The photochromic materials to be used in a photochromic article can be associated with a host material e.g., polymeric coating or film material, by various means. In a series of non-limiting embodiments, the photochromic materials can be incorporated, e.g., dissolved and/or dispersed, into the host material, polymerized with other components of the host material, e.g., in a reaction injection molding, or film extrusion operation and/or incorporated into an at least partial coating or film applied to a substrate, e.g., an at least partially cured polymeric coating or at least partial covering of a film applied to one surface of the substrate. Alternatively, the photochromic materials can be incorporated into the at least partially cured coating or film by imbibition, permeation or other transfer methods as known by those skilled in the art.

In another non-limiting embodiment, the amount of the photochromic materials to be incorporated into a polymeric coating composition and/or polymeric film can vary widely. Typically, a sufficient amount is used to produce a photochromic effect discernible to the naked eye upon activation. Generally, such amount can be described as a photochromic amount. The particular amount used depends often upon the intensity of color desired upon irradiation thereof and upon the method used to incorporate the photochromic materials. Typically, in one non-limiting embodiment, the more photochromic incorporated, the greater is the color intensity up to a certain limit. There is a point after which the addition of any more material will not have a noticeable effect, although more material can be added, if desired.

The relative amounts of the aforesaid photochromic materials used will vary and depend in part upon the relative intensities of the color of the activated species of such materials, the ultimate color desired, and the method of application to the host material and/or substrate. In one non-limiting embodiment, the amount of photochromic material incorporated by imbibition into a photochromic optical host material, e.g., a coating or film. can vary widely. In alternate non-limiting embodiments, it can range from 0.01 to 2.0, or from 0.05 to 1.0, milligrams per square centimeter of surface to which the photochromic compound is incorporated or applied. The amount of photochromic substance incorporated or applied to the host material can range between any combination of these values, inclusive of the recited range, e.g., 0.015 to 1.999 milligrams per square centimeter.

In another non-limiting embodiment, the total amount of photochromic material incorporated into a polymerizable composition for forming a coating, film or polymerizate can vary widely, e.g., it can range from 0.01 to 40 weight percent based on the weight of the solids in the polymerizable composition. In alternate non-limiting embodiments, the concentration of photochromic materials ranges from 0.1 to 30 weight percent, from 1 to 20 weight percent, from 5 to 15 weight percent, or from 7 to 14 weight percent. The amount of photochromic materials in the polymerizable composition can range between any combination of these values, inclusive of the recited range, e.g., 0.011 to 39.99 weight percent.

In one non-limiting embodiment, compatible (chemically and color-wise) fixed tint dyes can be added or applied to the substrate or host material e.g., polymeric coating and/or polymeric film, used to produce the photochromic article to achieve a more aesthetic result, for medical reasons, or for reasons of fashion. The particular dye selected will vary and depend on the aforesaid need and result to be achieved. In one non-limiting embodiment, the dye can be selected to complement the color resulting from the activated photochromic materials, e.g., to achieve a more neutral color or absorb a particular wavelength of incident light. In another non-limiting embodiment, the dye can be selected to provide a desired hue to the host material when the photochromic materials are in an unactivated state.

In various non-limiting embodiments, adjuvant materials can also be incorporated into host material used to produce the photochromic article. Such adjuvants can be used, prior to, simultaneously with or subsequent to application or incorporation of the photochromic material. For example, ultraviolet light absorbers can be admixed with photochromic materials before their addition to the composition or such absorbers can be superposed, e.g., superimposed, as a coating or film between the photochromic article and the incident light.

Further, stabilizers can be admixed with the photochromic materials prior to their addition to the composition to improve the light fatigue resistance of the photochromic materials. Non-limiting examples of stabilizers include hindered amine light stabilizers (HALS), asymmetric diaryloxalamide (oxanilide) compounds and singlet oxygen quenchers, e.g., a nickel ion complex with an organic ligand, polyphenolic antioxidants or mixtures of such stabilizers are contemplated. In one non-limiting embodiment, they can be used alone or in combination. Such stabilizers are described in U.S. Pat. Nos. 4,720,356, 5,391,327 and 5,770,115.

The present invention is more particularly described in the following examples, which are intended as illustrative only, since numerous modifications and variations therein will be apparent to those skilled in the art.

Examples 1–12 are of the adhesion enhancing formulations of the present invention. Comparative Examples A, B, and C are of coupling agent compositions that are substantially free of the epoxy containing material comprising at least 2 epoxy groups. Examples 13 describes the cleaning and coating of lenses with the adhesion enhancing coating composition in Part A, curing of the lenses in Part B, application of photochromic polymeric coatings in Part C, curing of photochromic coatings in Part D and adhesion testing of individual lenses in Part E.

EXAMPLE 1

Part A

The following materials were added in the order described to a suitable vessel equipped with an agitator.

| Material | Weight (grams) |
| --- | --- |
| CHARGE 1 | |
| γ-Glycidoxypropyltrimethoxysilane | 20.5 |
| Tetramethoxysilane | 5.5 |
| Deionized water | 7.3 |
| Nitric acid (70%) | 1 drop |
| CHARGE 2 | |
| Tetramethylammonium hydroxide (25%) | 1 drop |
| DOWANOL ™ PM[1] | 31.3 |
| DOWANOL ™ PMA[2] | 31.3 |
| CHARGE 3 | |
| TMPTGE[3] | 11.6 |
| THS[4] | 1.5 |

[1]A propylene glycol methyl ether solvent, available from Dow Chemical Company.
[2]A propylene glycol methyl ether acetate solvent, available from Dow Chemical Company.
[3]Trimethylolpropane triglycidyl ether.
[4]A triarylsulfonium hexafluorophosphate salt, mixed, 50% in propylene carbonate, and is available from Aldrich.

Charge 1 was added and within five minutes, the exotherm generated from the hydrolysis of the silanes caused an increase in the temperature of the reaction mixture from 15° C. to 35° C. The vessel was immersed in an ice bath and held for thirty minutes at 25° C. while mixing. Charge 2 was added and the resulting mixture was stirred five minutes. Charge 3 was added and the resulting mixture was stirred for 2 hours

Part B

The following materials were added in the order described to a suitable vessel equipped with an agitator and mixed for 2 hours.

| Material | Weight (grams) |
| --- | --- |
| Product of Part A | 20.1 |
| Methacryloxypropyltrimethoxysilane | 7.4 |
| THS | 0.1 |
| DYNOL ® 604[5] | 0.07 |

[5]A surfactant, reported to be ethoxylated acetylenic diols available from Air Products and Chemicals, Inc.

EXAMPLE 2

The procedure of Example 1, Part B was followed except that the following materials were used in the order and amounts described.

| Material | Weight (grams) |
| --- | --- |
| Product of Part A of Example 1 | 15.0 |
| Methacryloxypropyltrimethoxysilane | 5.6 |
| THS | 0.08 |
| DYNOL ® 604 | 0.05 |

EXAMPLE 3

The following materials were added in the order described to a suitable vessel equipped with an agitator and mixed for 2 hours.

| Material | Weight (grams) |
| --- | --- |
| EPON ® 828[6] | 11.4 |
| Methacryloxypropyltrimethoxysilane | 11.4 |
| 2-(Methacryloyloxy)ethyl succinate | 3.9 |
| TMPTGE | 3.3 |
| DOWANOL ™ DPM[7] | 12.1 |
| THS | 1.8 |

[6]Glycidyl end-capped poly(bisphenol A-co-epichlorohydrin) available from Shell Chemical Co.
[7]A mixture of isomers of di(propylene glycol) methyl ether available from Dow Chemical Co.

EXAMPLE 4

The procedure of Example 1, Part B was followed except that the following materials were used in the order and amounts described.

| Material | Weight (grams) |
| --- | --- |
| Product of Part A of Example 1 | 15.4 |
| Methacryloxypropyltrimethoxysilane | 6.7 |
| 2-(Methacryloyloxy)ethyl succinate | 2.2 |
| THS | 0.05 |
| DOWANOL ™ DPM | 5.7 |

EXAMPLE 5

The procedure of Example 1, Part B was followed except that the following materials were used in the order and amounts described.

| Material | Weight (grams) |
| --- | --- |
| Product of Part A of Example 1 | 15.1 |
| Methacryloxypropyltrimethoxysilane | 6.6 |
| 2-(Methacryloyloxy)ethyl succinate | 2.2 |
| THS | 0.3 |
| DOWANOL ™ DPM | 5.8 |

EXAMPLE 6

The procedure of Example 1, Part B was followed except that the following materials were used in the order and amounts described.

| Material | Weight (grams) |
| --- | --- |
| Product of Part A of Example 1 | 9.6 |
| Methacryloxypropyltrimethoxysilane | 4.2 |
| 2-(Methacryloyloxy)ethyl succinate | 1.4 |
| EPON ® 828 | 5.6 |
| THS | 0.1 |
| DOWANOL ™ DPM | 9.2 |

EXAMPLE 7

The procedure of Example 1, Part B was followed except that the following materials were used in the order and amounts described.

| Material | Weight (grams) |
| --- | --- |
| Product of Part A of Example 1 | 9.1 |
| Methacryloxypropyltrimethoxysilane | 4.0 |
| 2-(Methacryloyloxy)ethyl succinate | 1.3 |
| EPON ® 828 | 5.3 |
| DOWANOL ™ DPM | 9.5 |
| THS | 0.8 |

EXAMPLE 8

The procedure of Example 1, Part B was followed except that the following materials were used in the order and amounts described.

| Material | Weight (grams) |
| --- | --- |
| Product of Part A of Example 1 | 15.3 |
| Methacryloxypropyltrimethoxysilane | 6.7 |
| 2-(Methacryloyloxy)ethyl succinate | 2.2 |
| THS | 0.2 |
| DOWANOL ™ DPM | 5.7 |

EXAMPLE 9

The procedure of Example 1, Part B was followed except that the following materials were used in the order and amounts described.

| Material | Weight (grams) |
| --- | --- |
| Product of Part A of Example 1 | 9.3 |
| Methacryloxypropyltrimethoxysilane | 4.1 |
| 2-(Methacryloyloxy)ethyl succinate | 1.3 |
| EPON ® 828 | 5.4 |
| THS | 0.5 |
| DOWANOL ™ DPM | 9.3 |

EXAMPLE 10

The procedure of Example 1, Part B was followed except that the following materials were used in the order and amounts described.

| Material | Weight (grams) |
| --- | --- |
| Product of Part A of Example 1 | 11.8 |
| Methacryloxypropyltrimethoxysilane | 5.1 |
| 2-(Methacryloyloxy)ethyl succinate | 1.7 |
| EPON ® 828 | 3.4 |
| THS | 0.1 |
| DOWANOL ™ DPM | 7.8 |

EXAMPLE 11

The procedure of Example 1, Part B was followed except that the following materials were used in the order and amounts described.

| Material | Weight (grams) |
| --- | --- |
| Product of Part A of Example 1 | 11.4 |
| Methacryloxypropyltrimethoxysilane | 5.0 |
| 2-(Methacryloyloxy)ethyl succinate | 1.6 |
| EPON ® 828 | 3.3 |
| THS | 0.6 |
| DOWANOL ™ DPM | 8.1 |

EXAMPLE 12

The procedure of Example 1, Part B was followed except that the following materials were used in the order and amounts described.

| Material | Weight (grams) |
| --- | --- |
| Product of Part A of Example 1 | 11.6 |
| Methacryloxypropyltrimethoxysilane | 5.1 |
| 2-(Methacryloyloxy)ethyl succinate | 1.7 |
| EPON ® 828 | 3.4 |
| THS | 0.4 |
| DOWANOL ™ DPM | 8.0 |

COMPARATIVE EXAMPLE A

Part A

The following materials were added in the order described to a suitable vessel equipped with an agitator and mixed for 2 hours.

| Material | Weight (grams) |
| --- | --- |
| γ-Glycidoxypropyltrimethoxysilane | 348 |
| Deionized water | 80 |
| Nitric acid (70%) | 1 drop |
| DOWANOL ™ PM | 237 |
| DOWANOL ™ PMA | 237 |
| Tetramethylammonium hydroxide (25%) | 2 drops |

Part B

The following materials were added in the order described to a suitable vessel equipped with an agitator and mixed for 2 hours.

| Material | Weight (grams) |
| --- | --- |
| Product of Part A | 20.0 |
| Methacryloxypropyltrimethoxysilane | 6.3 |
| THS | 0.3 |

COMPARATIVE EXAMPLE B

Part A

The following materials were added in the order described to a suitable vessel equipped with an agitator and mixed for 2 hours.

| Material | Weight (grams) |
| --- | --- |
| γ-Glycidoxypropyltrimethoxysilane | 182 |
| Methacryloxypropyltrimethoxysilane | 184 |
| Deionized water | 81 |
| Nitric acid (70%) | 1 drop |
| DOWANOL ™ PM | 251 |
| DOWANOL ™ PMA | 251 |
| Tetramethylammonium hydroxide (25%) | 1 drop |
| BYK ® 306[8] | 1 |

[8] A surfactant reported to be a solution of polyether modified dimethylpolysiloxane copolymer, available from BYK - Chemie USA.

Part B

The following materials were added in the order described to a suitable vessel equipped with an agitator and mixed for 2 hours.

| Material | Weight (grams) |
| --- | --- |
| Product of Part A | 10.0 |
| THS | 0.2 |
| BYK ® 306 | 0.02 |

COMPARATIVE EXAMPLE C

Part A

The following materials were added in the order described to a suitable vessel equipped with an agitator and mixed for 2 hours.

| Material | Weight (grams) |
| --- | --- |
| γ-Glycidoxypropyltrimethoxysilane | 216 |
| Tetramethoxysilane | 144 |
| Deionized water | 116 |
| Nitric acid (70%) | 1 drop |
| DOWANOL ™ PM | 237 |
| DOWANOL ™ PMA | 237 |
| Tetramethylammonium hydroxide (25%) | 3 drops |

Part B

The following materials were added in the order described to a suitable vessel equipped with an agitator and mixed for 2 hours.

| Material | Weight (grams) |
| --- | --- |
| Product of Part A | 10.0 |
| Methacryloxypropyltrimethoxysilane | 6.5 |
| THS | 0.2 |

EXAMPLE 13

Part A

PDQ® (tintable) or GLC® (non-tintable) coated Gentex® polycarbonate plano lenses having a diameter of 76 millimeters were washed either manually or in an automated machine with dishwashing detergent and water, rinsed with the deionized water and dried. The cleaned lenses of Examples 1, 2, 3 and Comparative Examples A, B and C were treated with oxygen plasma at a flow rate of 100 milliliters(mL) per minute of oxygen at 100 watts of power for one minute. The cleaned lenses of Examples 4–12 were treated with oxygen plasma at a flow rate of 400 mL per minute of oxygen at 750 watts of power for five minutes. Solutions of Examples 1 and 2 and Comparative Examples A, B and C were coated onto PDQ® coated Gentex® polycarbonate lenses. Solutions of Examples 3 through 12 were coated onto GLC® coated Gentex® polycarbonate lenses.

The lenses were coated with Examples 1, 2 and 3 and Comparative Examples A, B and C by dispensing the sample for the indicated time onto the lenses spinning at the indicated speed below in Table 1. The lenses of Examples 4–12 were coated with an amount of solution to result in each lens having a wet coating weight of 0.021 gram after spinning for three seconds at 1500 rpm and for 20–25 seconds at 1500–1750 rpm.

TABLE 1

| Example No. | Dispense Time (sec) | Spin Speed (rpm) |
| --- | --- | --- |
| 1, 2 and CE-C | 9 | 1500 |
| 3 | 20 | 3000 |
| CE-A and CE-B | 9 | 1100 |

Part B

The coated lenses of Part A were cured by exposure to ultraviolet radiation under one of the following three conditions: beneath a Light-Welder® 5000-EC UV light source from DYMAX Corp., operated at 400 Watts at a distance of 4 inches from the light for the time listed below in Table 2; on an Ultraviolet Conveyor curing line traveling 4 inches beneath a 300 watts per inch Fusion "D" iron iodide doped mercury lamp at the speeds indicated below; or beneath a Xenon lamp operating at 300 Watts, 2 inches above the lens with a 300 nanometer cutoff filter in between the lamp and the lens for the time indicated in Table 2.

TABLE 2

| Example Lens # | DYMAX cure time (seconds) | UV Conveyor Speed (ft/sec) | Xenon lamp cure time (seconds) |
| --- | --- | --- | --- |
| 1A | 20 | | |
| 1B | 30 | | |
| 1C and 1D | 40 | | |
| 1E | | 9 | |
| 2A | 40 | | |
| 2B | 50 | | |
| 2C | | 3 | |
| 2D | | 4.5 | |
| 2E | | 6 | |
| 3A to 3E | 45 | | |
| 4A to 12G | | | 30 |
| CE-A-1 | | 3 | |
| CE-A-2 | 40 | | |
| CE-B-1 | | 3 | |
| CE-B-2 | | 4 | |
| CE-B-3 | 40 | | |
| CE-C-1 | | 3 | |

Part C

The lenses of Part B were coated with a photochromic coating (PC#) chosen from the following five formulations. Photochromic Coatings #1, 2 and 3 were prepared in 2 steps. Photochromic Coating #4 was prepared in 3 steps and Photochromic Coating #5 was prepared in one step as described hereinafter.

Photochromic Coatings #1, 2 AND 3

Charge 1

The following materials were added to a suitable vessel equipped with an agitator and mixed for 2 hours.

| Material | PC#1 (grams) | PC#2 (grams) | PC#3 (grams) |
| --- | --- | --- | --- |
| NMP[9] | 15.1 | 15.0 | 15.0 |
| Photochromic 1[10] | 2.6 | 1.4 | 1.4 |
| Photochromic 2[11] | 0.7 | 0.4 | 0.4 |
| Photochromic 3[12] | 3.3 | 1.7 | 1.7 |
| Photochromic 4[13] | 0.9 | 0.7 | 0.7 |
| Photochromic 5[14] | 0.9 | 0.9 | 0.9 |
| Photochromic 6[15] | 0.9 | 0.9 | 0.9 |
| FA-711MM[16] | — | 4.0 | 3.9 |
| I-245[17] | 3.0 | 2.0 | 2.1 |
| T-622[18] | 2.0 | — | — |
| TPO[19] | 0.3 | 0.3 | 0.3 |
| BAPO[20] | 0.2 | 0.2 | 0.2 |

[9] N-methyl-2-pyrrolidone solvent.
[10] A photochromic naphtho[1,2-b]pyran that exhibits a blue color when irradiated with ultraviolet light.
[11] A photochromic naphtho[1,2-b]pyran that exhibits a blue color when irradiated with ultraviolet light.
[12] A photochromic naphtho[1,2-b]pyran that exhibits a yellow color when irradiated with ultraviolet light.
[13] A photochromic naphtho[1,2-b]pyran that exhibits a yellow color when irradiated with ultraviolet light.
[14] A photochromic naphtho[1,2-b]pyran that exhibits a blue color when irradiated with ultraviolet light.
[15] A photochromic naphtho[1,2-b]pyran that exhibits a yellow color when irradiated with ultraviolet light.
[16] A methacrylate functional hindered amine stabilizer reported to be 4-(methacryloyloxy)-1,2,2,6,6-pentamethylpiperidine, available from Hitachi Chemical Co.
[17] IRGANOX 245 antioxidant stabilizer, available from Ciba Chemicals.
[18] TINUVIN 622 hindered amine light stabilizer, available from Ciba Chemicals.
[19] Diphenyl (2,4,6-trimethylbenzoyl) phosphine oxide.
[20] Bis (2,4,6-trimethylbenzoyl) phenylphosphine oxide.

Charge 2

The following materials were added to a suitable vessel equipped with an agitator and mixed for two hours

| Material | PC#1 (grams) | PC#2 (grams) | PC#3 (grams) |
| --- | --- | --- | --- |
| BPA 2 EO DMA[21] | 7.2 | 3.4 | 6.0 |
| BPA 10 EO DMA[22] | 18.9 | — | — |
| TMPTMA[23] | 4.0 | 5.0 | 10.0 |
| TEGDMA[24] | — | 15.0 | 30.0 |
| PC-DMA[25] | — | 22.0 | 44.0 |
| MPTMS[26] | — | 5.1 | 10.0 |

-continued

| Material | PC#1 (grams) | PC#2 (grams) | PC#3 (grams) |
|---|---|---|---|
| Charge 1 | 11.2 | 13.8 | 27.5 |
| FC-431[27] | 0.6 | 0.1 | 0.1 |

[21] Bisphenol A ethoxylated (1EO/phenyl) dimethacrylate.
[22] Bisphenol A ethoyxlated (5EO/phenyl) dimethacrylate.
[23] Trimethylolpropane trimethacrylate.
[24] Triethyleneglycol dimethacrylate.
[25] Polycarbonate dimethacrylate prepared as described hereinafter.
[26] Methacryloxypropyltrimethoxysilane.
[27] A fluorinated surfactant available from 3M.

Polycarbonate Dimethacrylate

The material was prepared from the ingredients as summarized below.

TABLE 1

| Ingredients | Weight (grams) |
|---|---|
| Charge 1 | |
| PC-1122 (a) | 936.10 |
| THF (b) | 500.00 |
| MEHQ (c) | 0.20 |
| Charge 2 | |
| ICEMA (d) | 155.16 |
| THF | 500.00 |

(a) An aliphatic polycarbonate diol, reported to be polyhexamethylene dicarbonate, available from Stahl USA.
(b) Tetrahydrofuran
(c) Hydroquinone monomethylether
(d) Isocyanatoethylmethacrylate Charge 1 was added to an all glass reactor. The ingredients were mixed with an air sparge. Heat was applied to the charge in the reactor until the charge reached a temperature of 60° C. Charge 2 was added over a period of about an hour. Upon completion of the addition of Charge 2, the reaction mixture was mixed for 6 hours. The resulting solution was vacuum stripped at 40° C. and 10 mm of mercury for 1 hour. The resulting polymer solution had a measured total solids content, based on the total solution weight, of about 91.71%. The polymer had a weight average molecular weight, as measured by gel permeation chromatography using polystyrene as a standard, of about 6473 and a number average molecular weight of 2480.

Photochromic Coating #4

The following charges were added in the order described to a suitable vessel equipped with an agitator with continuous mixing until all of the ingredients were dissolved.

| Material | Weight (grams) |
|---|---|
| Charge 1 | |
| NMP | 15.00 |
| Photochromic 1 | 1.14 |
| Photochromic 2 | 0.36 |
| Photochromic 3 | 1.92 |
| Photochromic 4 | 0.90 |
| Photochromic 6 | 1.02 |
| Photochromic 7[28] | 0.18 |
| Photochromic 8[29] | 0.48 |
| Keyplast Blue[30] | 0.01 |
| Keyplast Magenta[31] | 0.01 |
| I-245 | 2.10 |
| FA-711MM | 3.90 |
| Charge 2 | |
| MPTMS | 10.00 |
| TMPTMA | 10.00 |
| TEGDMA | 30.00 |
| BPA2EODMA | 6.00 |
| PC1122DMA | 44.00 |
| FC-431 | 0.10 |
| Charge 3 | |
| BAPO | 0.20 |
| TPO | 0.30 |

[28] A photochromic naphtho[1,2-b] pyran that exhibits a yellow color when irradiated with ultraviolet light.
[29] A photochromic naphtho[1,2-b] pyran that exhibits a blue color when irradiated with ultraviolet light.
[30] A blue dye available from Keystone Aniline Corp.
[31] A dark red dye available from Keystone Aniline Corp.

Photochromic Coating #5

The following materials were added in the order described to a suitable vessel equipped with an agitator and mixed for two hours.

| Material | Weight (grams) |
|---|---|
| BPA 2 EO DMA | 18.27 |
| BPA 10 EO DMA | 72.03 |
| TMPTMA | 10.10 |
| NMP | 15.15 |
| Photochromic 1 | 2.63 |
| Photochromic 2 | 0.68 |
| Photochromic 3 | 3.31 |
| Photochromic 4 | 0.41 |
| I-245 | 3.02 |
| T-622 | 2.04 |
| TPO | 0.30 |
| BAPO | 0.20 |
| FC-431 | 0.14 |

The aforesaid photochromic coatings were applied to the lenses by dispensing the sample for the time indicated below in Table 3 onto the lenses spinning at the indicated speeds for all of the lenses except those coated with Examples 4–12. Lenses 4A–D through 12A–G were coated at one speed and spun at a higher speed without further dispensing of coating solutions.

TABLE 3

| Lenses Coated with Example # | Photochromic Coating # | Dispense Time (Sec.) | Spinning Speed (rpm) |
|---|---|---|---|
| 1 A–D to 2 A–D | 1 | 5.0 | 1,500 |
| 3 A–D | 2 | 7.0 | 1,500 |
| 3 E | 3 | 7.0 | 1,500 |
| 4 A–D to 12 A–G | 4 | 6.0 | 1,000 |
| | | 3.6* | 2,000 |

TABLE 3-continued

| Lenses Coated with Example # | Photochromic Coating # | Dispense Time (Sec.) | Spinning Speed (rpm) |
|---|---|---|---|
| CE-A-1 and 2 CE-B-1, 2 and 3 CE-C-1 | 5 | 6.5 | 1,500 |

*Photochromic coating was not dispensed during this fast spinning interval.

Part D

The lenses of Part C coated with Comparative Examples A, B and C and Examples 1, 2 and 3 (except lens 3E) were cured by exposure to ultraviolet radiation in an atmosphere having less than 100 ppm of oxygen in an EYE Ultraviolet Conveyor line traveling three feet per minute beneath two 400 watt/inch gallium iodide mercury lamps, one positioned 3.5 inches above the conveyor and the other positioned 7.0 inches above the conveyor. Lens 3E was cured on the EYE Ultraviolet Conveyor line at the same speed except that "V" type bulbs were used in place of the gallium iodide doped mercury lamps. Lenses 3C and 3D were also placed in a 100° oven for three hours after the ultraviolet cure. The lenses of Examples 4–12 were cured in a nitrogen purged chamber by exposure to a 300 watt Xenon bulb two inches above the lenses while the lenses rotated at 100 rpm for 28 seconds.

Part E

The adhesion of the coated lenses was tested using a procedure which is a modification of ASTM D-3539 Standard Test Method for Measuring Adhesion by Tape Test—Method B. The standard method was modified to include retesting of a different site on the same sample tested for Dry Adhesion after the sample was held in boiling water for an hour after which the Wet Adhesion Test was done. Results are reported as Percent Remaining after testing. Typically, if the sample failed the Dry Adhesion Test, it was not subjected to the Wet Adhesion Test. The tape used was 3M #600 clear tape. Results are listed in Table 4.

TABLE 4

| Example Number | Percent Remaining In Dry Adhesion Test | Percent Remaining In Wet Adhesion Test |
|---|---|---|
| 1A | 70–80 | 100 |
| 1B | 90 | 90 |
| 1C | 100 | 100 |
| 1D | 95 | 100 |
| 1E | 100 | 100 |
| 2A | 95 | 95 |
| 2B | 85–95 | 100 |
| 2C | 80 | 100 |
| 2D | 100 | 100 |
| 2E | 100 | 100 |
| 3A | 95 | 95 |
| 3B | 95 | 95 |
| 3C | 100 | 100 |
| 3D | 100 | 100 |
| 3E | 100 | 100 |
| 4A | 22 | 20 |
| 4B | 30 | 36 |
| 4C | 20 | 35 |
| 4D | 28 | 32 |
| 5A | 17 | 12 |
| 5B | 12 | 16 |

TABLE 4-continued

| Example Number | Percent Remaining In Dry Adhesion Test | Percent Remaining In Wet Adhesion Test |
|---|---|---|
| 5C | 11 | 10 |
| 5D | 10 | 40 |
| 6A | 26 | 48 |
| 6B | 20 | 33 |
| 6C | 21 | 30 |
| 6D | 33 | 30 |
| 7A | 100 | 100 |
| 7B | 99 | 99 |
| 7C | 100 | 100 |
| 7D | 98 | 90 |
| 8A | 20 | 28 |
| 8B | 11 | 20 |
| 8C | 12 | 35 |
| 8D | 13 | 28 |
| 9A | 92 | 99 |
| 9B | 97 | 90 |
| 9C | 95 | 98 |
| 9D | 97 | 98 |
| 10A | 28 | 38 |
| 10B | 12 | 35 |
| 10C | 10 | 45 |
| 10D | 35 | 25 |
| 11A | 96 | 97 |
| 11B | 93 | 98 |
| 11C | 98 | 99 |
| 11D | 93 | 100 |
| 12A | 17 | 66 |
| 12B | 36 | 55 |
| 12C | 32 | 80 |
| 12D | 28 | 68 |
| 12E | 60 | 70 |
| 12F | 45 | 38 |
| 12G | 33 | 70 |
| CE-A-1 | 0 | — |
| CE-A-2 | 10** | — |
| CE-B-1 | 0 | — |
| CE-B-2 | 0 | — |
| CE-B-3 | 0 | — |
| CE-C-1 | 0 | — |

**Coating pulled away from the lens at the edge. Such a defect was not observed on any of the lenses coated with Examples 1–12.

The results of Table 4 show that samples in which the coupling agent was combined with the material having at least two epoxy groups showed improved adhesion results when compared to lenses coated with the comparative examples which did not include the epoxy containing material.

All of the lenses coated with the comparative examples (except CE-A-2) demonstrated 0% adhesion on the Dry Adhesion Test and were not subjected to the Wet Adhesion Test. Lens CE-A-2 demonstrated 10% adhesion in the Dry Adhesion Test but the coating was separating from the lens at the edge so it was not subjected to Wet Adhesion Testing.

The present invention has been described with reference to specific details of particular embodiments thereof. It is not intended that such details be regarded as limitations upon the scope of the invention except insofar as to the extent that they are included in the accompanying claims.

We claim:

1. A coating composition adapted to enhance the adhesion of a polymeric coating applied to a substrate, said coating composition comprising:
   a) at least one silane coupling agent, at least partial hydrolysates thereof or mixtures thereof, in a concentration greater than 25 weight percent, based on the weight of the total composition, represented by the following formula:

$$(R_1)_a(R_2)_b Si(OR_3)_c$$

wherein each $R_1$ is an organofunctional group chosen from mercapto, glycidoxy, (meth)acryloyloxy, or a hydrocarbon radical chosen from $C_1$–$C_6$ alkyl or phenyl, said hydrocarbon radical being substituted with said organofunctional group; each $R_2$ is a hydrocarbon radical having less than 20 carbon atoms independently chosen for each occurrence from aliphatic radicals, aromatic radicals or mixtures of such hydrocarbon radicals; each $R_3$ is $C_1$–$C_6$ alkyl, phenyl, acetyl or benzoyl; a is 1, b is 0 and c is 3; and b) an adhesion enhancing amount of an epoxy-containing material comprising at least two epoxy groups; said coating composition being substantially free of photochromic material and colloidal particles chosen from silica, alumina or mixtures thereof.

2. The coating composition of claim 1 wherein the epoxy-containing material comprising at least 2 epoxy groups is chosen from: glycerol polyglycidyl ether; diglycerol polyglycidyl ether; glycerol propoxylate triglycidyl ether; trimethyloipropane triglycidyl ether; sorbitol polyglycidyl ether; poly(ethylene glycol)diglycidyl ether; poly(propylene glycol)diglycidyl ether; neopentyl glycol diglycidyl ether; N,N-diglycidyl-4-glycidyloxyaniline; N,N'-diglycidyltoluidine; 1,6-hexane diol diglycidyl ether; diglycidyl 1,2-cyclohexanedicarboxylate; diglycidyl bisphenol A; a polymer of diglycidyl bisphenol A; poly(bisphenol A-co-epichlorohydrin), glycidyl endcapped; diglycidyl of a hydrogenated bisphenol A propylene oxide adduct; diglycidyl ester of terephthalic acid; diglycidyl 1,2,3,6-tetrahydrophthalate; spiroglycoldiglycidyl ether; hydroquinone diglycidyl ether or mixtures thereof.

3. The coating composition of claim 1 further comprising a catalyst chosen from an acidic material, a material different from the acidic material adapted to generate acid upon exposure to actinic radiation, or a mixture thereof.

4. The coating composition of claim 3 wherein the catalyst is an acidic material and is chosen from an organic acid, inorganic acid or mixture thereof.

5. The coating composition of claim 4 wherein the catalyst is an acidic material and is chosen from acetic, formic, glutaric, maleic, nitric, hydrochloric, phosphoric, hydrofluoric, or sulfuric acid.

6. The coating composition of claim 3 wherein the catalyst is a material adapted to generate acid upon exposure to actinic radiation and is chosen from onium salts, iodosyl salts, aromatic diazonium salts, metallocenium salts, sulphonate esters of aromatic alcohols containing a carbonyl group in a position alpha or beta to the sulphonate ester group, N-sulphonyloxy derivatives of an aromatic amide or imide, aromatic oxime sulphonates, quintone diazides or mixtures thereof.

7. The coating composition of claim 6 wherein the catalyst is a material adapted to generate acid upon exposure to actinic radiation and is chosen from diaryliodonium salts, triarylsulfonium salts or mixtures thereof.

8. The coating composition of claim 6 further comprising at least one photosensitive dye.

9. A coated article comprising:
(a) a substrate;
(b) the coating composition of claim 1;
(c) an at least partially cured polymeric coating; wherein the coating composition of (b) is interposed between the substrate of (a) and the polymeric coating of (c).

10. The coated article of claim 9 wherein the polymeric coating is a photochromic coating and the substrate is an organic polymeric material.

11. A coating composition adapted to enhance the adhesion of a polymeric coating applied to a substrate, said coating composition comprising:

a) at least one coupling agent, at least partial hydrolysates thereof or mixtures thereof, in a concentration greater than 25 weight percent, based on the weight of the total composition; and b) an adhesion enhancing amount of an epoxy-containing material comprising at least two epoxy groups; said coating composition being substantially free of photochromic material and colloidal particles chosen from silica, alumina or mixtures thereof; wherein the epoxy-containing material comprising at least 2 epoxy groups is chosen from materials represented by the following graphic formulae I and II or mixtures of such materials;

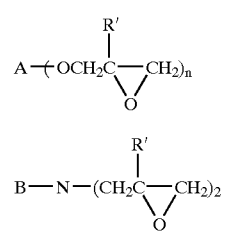

wherein
(i) R' is hydrogen or $C_1$–$C_3$ alkyl;
(ii) n is an integer chosen from 2, 3 or 4; A is chosen from $C_2$–$C_{20}$ alkylene, substituted $C_2$–$C_{20}$ alkylene, $C_3$–$C_{20}$ cycloalkylene, substituted $C_3$–$C_{20}$ cycloalkylene; the unsubstituted or substituted arylene groups, phenylene and naphthylene; aryl($C_1$–$C_3$)alkylene, substituted aryl ($C_1$–$C_3$)alkylene; the group —C(O)Z(O)C— wherein Z is $C_2$–$C_{20}$ alkylene or arylene; the group —R—(OR)$_m$— or —(OR)$_m$—, wherein R is $C_2$–$C_4$ alkylene and m is an integer from 1 to 20; phthaloyl, isophthathoyl, terephthaloyl; hydroxyl-substituted phthaloyl, hydroxy-substituted isophthaloyl, hydroxy-substituted terephthaloyl; or a group represented by the following graphic formula:

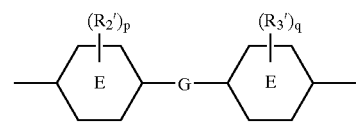

wherein $R_2'$ and $R_3'$ are each independently for each occasion chosen from $C_1$–$C_4$ alkyl, chlorine or bromine; p and q are each an integer from 0 to 4;

represents a divalent benzene group or a divalent cyclohexane group; G is —O—, —S—, —S(O$_2$)—, —C(O)—, —CH$_2$—, —CH=CH—, —C(CH$_3$)$_2$—, —C(CH$_3$)(C$_6$H$_5$)—, —(C$_6$H$_4$)— or

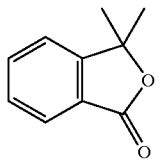  when is the divalent benzene group; or G is —O—, —S—, —CH$_2$—, or —C(CH$_3$)$_2$—, when

is the divalent cyclohexane group; said alkylene and cycloalkylene substituents being carboxy, hydroxy or C$_1$–C$_3$ alkoxy; said arylene and aryl(C$_1$–C$_3$)alkylene substituents being carboxy, hydroxy, C$_1$–C$_3$ alkoxy or C$_1$–C$_3$ alkyl; and (iii) B is chosen from C$_2$–C$_{20}$ alkyl, substituted C$_2$–C$_{20}$ alkyl, C$_3$–C$_{20}$ cycloalkyl, substituted C$_3$–C$_{20}$ cycloalkyl; the unsubstituted or substituted aryl groups, phenyl and naphthyl; aryl(C$_1$–C$_3$)alkyl or substituted aryl(C$_1$–C$_3$)alkyl; said alkyl and cycloalkyl substituents being carboxy, hydroxy or C$_1$–C$_3$ alkoxy, said aryl and aryl(C$_1$–C$_3$)alkyl substituents being carboxy, hydroxy, C$_1$–C$_3$ alkoxy or C$_1$–C$_3$ alkyl.

12. The coating composition of claim 11 wherein: R' is hydrogen; A is chosen from C$_2$–C$_{10}$ alkylene, phenylene, —R—(OR)$_m$— or —(OR)$_m$—, wherein R and m are the same as defined hereinbefore; or phthaloyl; and B is chosen from C$_2$–C$_{10}$ alkyl, phenyl or phenyl(C$_1$–C$_3$)alkyl.

13. The coating composition of claim 11 further comprising: a material represented by:

$$(R_{12})_e MX_{(4-e)}$$

hydrolysates of said material or a mixture thereof; wherein M is chosen from silicon, titanium or zirconium, X is independently chosen for each occasion from halogen, alkoxy groups of from 1 to 12 carbon atoms or acyloxy groups of from 1 to 12 carbon atoms, R$_{12}$ is independently chosen for each occasion from alkoxy groups of from 1 to 12 carbon atoms, aliphatic hydrocarbon groups of from 1 to 12 carbon atoms, or acyloxy groups of from 1 to 12 carbon atoms, and e is the integer 1, 2, or 3.

14. The coating composition of claim 13 wherein M is chosen from silicon, X is independently chosen for each occasion from alkoxy groups of from 1 to 6 carbon atoms or acyloxy groups of from 1 to 6 carbon atoms; R$_{12}$ is independently chosen for each occasion from alkoxy groups of from 1 to 6 carbon atoms or aliphatic hydrocarbon groups of from 1 to 6 carbon atoms; and e is the integer 1 or 2.

15. The coating composition of claim 13 wherein the material is chosen from methyltrimethoxysilane, methyltriethoxysilane, methyltriacetoxysilane, methyltripropoxysilane, methyltributoxysilane, ethyltrimethoxysilane, ethyltriethoxysilane, dimethyldiethoxysilane, tetramethoxysilane, tetraethoxysilane, tetra-n-propoxysilane, tetra-n-butoxysilane, tetra(C$_1$–C$_{18}$)alkoxy titanates, methyltriethoxy titanium (iv), tetra(C$_1$–C$_{18}$)alkoxy zirconates, phenylzirconium (iv)trichloride, hydrolysates thereof, or mixtures thereof.

16. A coated article comprising:
(a) a substrate;
(b) the coating composition of claim 11;
(c) an at least partially cured polymeric coating; wherein the coating composition of (b) is interposed between the substrate of (a) and the polymeric coating of (c).

17. A coating composition adapted to enhance the adhesion of a polymeric coating applied to a substrate, said coating composition comprising:
(a) at least one coupling agent, partial hydrolysates of said at least one coupling agent, or mixtures of said coupling agent and said hydrolysates all in a concentration of greater than 25 weight percent, based on the weight of the total composition,
(b) an adhesion enhancing amount of an epoxy-containing material comprising at least two epoxy groups, and
(c) at least one material comprising at least one (meth) acrylic group and at least one carboxylic group, said coating composition being substantially free of photochromic materials and colloidal particles chosen from silica, alumina or mixtures thereof.

18. The coating composition of claim 17 wherein the material comprising at least one (meth)acrylic group and at least one carboxylic group is represented by the following formula:

$$CH_2\!\!=\!\!C(R_4)C(O)OR_5OC(O)CR_6R_7CR_8R_9(CR_{10}R_{11})_d\!\!-\!\!COOH$$

wherein R$_4$ is hydrogen or methyl, R$_5$ is a substituted or unsubstituted alkylene group having from 2 to 6 carbon atoms, and R$_6$, R$_7$, R$_8$, R$_9$, R$_{10}$ and R$_{11}$ are independently chosen for each occasion from hydrogen, straight or branched chain, saturated or unsaturated aliphatic, cycloaliphatic or polycycloaliphatic groups having from 1 to 20 carbon atoms and d is chosen from 0 or 1.

19. The coating composition of claim 17 wherein the material comprising at least one (meth)acrylic group and at least one carboxylic group is chosen from mono-2-(acryloytoxy)ethyl succinate, mono-2-(methacryloyloxy)ethyl phthalate, mono-2-(methacryloyloxy)ethyl maleate, mono-2-(methacryloyloxy)ethyl succinate or mixtures thereof.

20. A coated article comprising:
(a) a substrate;
(b) the coating composition of claim 17;
(c) an at least partially cured polymeric coating; wherein the coating composition of (b) is interposed between the substrate of (a) and the polymeric coating of (c).

* * * * *